United States Patent
Beck

[19]

[11] Patent Number: 6,164,032

[45] Date of Patent: *Dec. 26, 2000

[54] REINFORCED EXTERIOR SIDING

[75] Inventor: David H. Beck, Jackson, Mich.

[73] Assignee: CertainTeed Corporation, Valley Forge, Pa.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/411,482

[22] Filed: Oct. 1, 1999

Related U.S. Application Data

[62] Division of application No. 09/197,487, Nov. 20, 1998, which is a continuation of application No. 08/644,135, May 10, 1996, Pat. No. 5,839,247, which is a continuation of application No. 08/456,249, May 31, 1995, Pat. No. 5,526,627, which is a continuation of application No. 08/171,726, Dec. 22, 1993, Pat. No. 5,461,839.

[51] Int. Cl.⁷ ........................................... E04D 1/00
[52] U.S. Cl. ................................. 52/519; 52/524
[58] Field of Search ............................ 52/519, 520, 521, 52/532, 541, 544, 746, 747, 748, 524

[56] References Cited

U.S. PATENT DOCUMENTS

| | | |
|---|---|---|
| 876,098 | 1/1908 | Savery . |
| 1,410,299 | 3/1922 | Harshberger . |
| 2,062,149 | 11/1936 | Stark et al. . |
| 2,126,676 | 8/1938 | Thomas . |
| 2,654,328 | 10/1953 | McCullough . |
| 3,214,876 | 11/1965 | Mattes . |
| 3,282,009 | 11/1966 | Chalmers . |
| 3,324,617 | 6/1967 | Knight et al. . |
| 3,343,325 | 9/1967 | Curran . |
| 3,430,395 | 3/1969 | Lashkow . |
| 3,469,873 | 9/1969 | Glaros . |
| 3,478,138 | 11/1969 | Friesner . |
| 3,504,467 | 4/1970 | Hatch et al. . |
| 3,520,099 | 7/1970 | Mattes ............................ 52/531 |
| 3,552,078 | 1/1971 | Mattes . |
| 3,593,479 | 7/1971 | Hinds . |
| 3,647,616 | 3/1972 | Zemlin . |
| 3,687,764 | 8/1972 | Rogosch et al. . |
| 3,706,216 | 12/1972 | Weingarten . |
| 3,715,420 | 2/1973 | Kiyono et al. . |
| 3,993,726 | 11/1976 | Moyer ............................ 264/174 |
| 3,998,021 | 12/1976 | Lewis . |
| 4,034,528 | 7/1977 | Sanders et al. . |
| 4,096,011 | 6/1978 | Sanders et al. . |
| 4,100,325 | 7/1978 | Summers et al. . |
| 4,118,166 | 10/1978 | Bartrum . |
| 4,134,244 | 1/1979 | Sjolander . |
| 4,169,180 | 9/1979 | McDonagh . |
| 4,177,615 | 12/1979 | Anderson . |
| 4,183,777 | 1/1980 | Summers et al. . |
| 4,187,270 | 2/1980 | Bartrum . |
| 4,217,741 | 8/1980 | Cole . |
| 4,247,506 | 1/1981 | Summers . |
| 4,258,520 | 3/1981 | Rehbein . |
| 4,274,236 | 6/1981 | Kessler . |
| 4,290,248 | 9/1981 | Kemerer et al. . |
| 4,294,752 | 10/1981 | Silberberg ...................... 260/42.14 |

(List continued on next page.)

*Primary Examiner*—Christopher T. Kent
*Assistant Examiner*—Jennifer I. Thissell
*Attorney, Agent, or Firm*—Duane Morris & Heckscher LLP

[57] ABSTRACT

Exterior finishing panels are provided which contain an elongated, thermoplastic sheet which is supported by a rigid support member disposed along a portion of the length of the sheet. The rigid support member has a flexural modulus which is significantly greater than the modulus of the thermoplastic sheet, so as to support the panel during handling and installation. The panels of this invention will be more kink-resistant, and will ride uneven walls better to present a flatter-looking finished wall surface. These panels are also capable of being worked with ordinary hand tools, such as a standard wood saw made of steel or carbide.

15 Claims, 3 Drawing Sheets

FOREIGN PATENT DOCUMENTS

| | | |
|---|---|---|
| 4,308,702 | 1/1982 | Rajewski . |
| 4,444,818 | 4/1984 | Tominaga et al. . |
| 4,450,665 | 5/1984 | Katz . |
| 4,514,947 | 5/1985 | Grail . |
| 4,536,362 | 8/1985 | Donaldson . |
| 4,556,376 | 12/1985 | Sievers et al. . |
| 4,575,983 | 3/1986 | Lott, Jr. et al. . |
| 4,669,238 | 6/1987 | Kellis et al. . |
| 4,685,879 | 8/1987 | Pürstinger et al. . |
| 4,718,214 | 1/1988 | Waggoner . |
| 4,740,405 | 4/1988 | Tanaka et al. . |
| 4,767,817 | 8/1988 | Lee . |
| 4,786,350 | 11/1988 | Nesbitt et al. . |
| 4,788,088 | 11/1988 | Kohl . |
| 4,788,808 | 12/1988 | Slocum . |
| 4,840,824 | 6/1989 | Davis . |
| 4,856,975 | 8/1989 | Gearhart . |
| 4,874,306 | 10/1989 | Gearhart . |
| 4,911,628 | 3/1990 | Heilmayr et al. . |
| 4,929,483 | 5/1990 | Halg et al. . |
| 4,930,287 | 6/1990 | Volk et al. . |
| 4,947,609 | 8/1990 | Champagne . |
| 4,963,403 | 10/1990 | Roberts et al. . |
| 5,030,676 | 7/1991 | Wallen . |
| 5,053,176 | 10/1991 | Cameron et al. . |
| 5,076,777 | 12/1991 | Schmitt . |
| 5,224,318 | 7/1993 | Kemerer . |
| 5,232,751 | 8/1993 | Cameron et al. . |
| 5,241,785 | 9/1993 | Meyer . |
| 5,324,277 | 6/1994 | Davies . |
| 5,358,680 | 10/1994 | Boissonnat et al. . |
| 5,363,623 | 11/1994 | King . |
| 5,388,381 | 2/1995 | Bilinksi et al. . |
| 5,393,536 | 2/1995 | Brandt et al. . |
| 5,415,921 | 5/1995 | Grohman . |
| 5,461,839 | 10/1995 | Beck . |
| 5,465,543 | 11/1995 | Seifert . |
| 5,526,627 | 6/1996 | Beck . |
| 5,565,056 | 10/1996 | Lause et al. . |
| 5,661,939 | 9/1997 | Coulis et al. . |
| 5,729,946 | 3/1998 | Beck . |
| 5,839,247 | 10/1998 | beck . |
| 5,857,303 | 1/1999 | Beck et al. . |

REINFORCED EXTERIOR SIDING

CROSS-REFERENCE TO RELATED APPLICATION

This application is a divisional application of U.S. Ser. No. 09/197,487, filed Nov. 20, 1998, which is a continuation of U.S. Ser. No. 08/644,135, filed May 10, 1996, now U.S. Pat. No. 5,839,247, issued on Nov. 24, 1998; which in turn is a continuation of U.S. Ser. No. 08/456,249 filed May 31, 1995, now U.S. Pat. No. 5,526,627, issued on Jun. 18, 1996; which in turn is a continuation of Ser. No. 08/171,726, filed on Dec. 22, 1993, now U.S. Pat. No. 5,461,839, issued on Oct. 31, 1995.

FIELD OF THE INVENTION

This invention relates to sheathing materials used on the exterior surfaces of buildings, and particularly to exterior thermoplastic siding and procedures for making such siding more rigid.

BACKGROUND OF THE INVENTION

For decades, the exterior of many residential and commercial buildings has been protected by "finishing" or "sheathing" materials including wood, metal, and polymer resins. Metal sheathing, such as aluminum siding, was at one point very popular, since it was more insect- and weather-resistant than wood siding, and could be anodized, painted, or laminated to provide a plurality of colors and styles. Metal sheathing also proved to be long lasting and energy efficient, but because it could not be easily sawed, clipped, or drilled with hand tools, it was relatively labor intensive to install. Additionally, metal sheathing materials had to be extremely thin to be cost efficient, and, because of their inherent lack of ductility, were susceptible to dents by minor impact loads.

In more recent times, "vinyl siding", (which is actually a resinous composition containing polyvinyl chloride), has provided a cheaper and more impact-resistant material for exterior siding panels. This material can also be provided in a wide variety of colors and patterns, but is more flexible and forgiving, and hence, will not deform plastically under minor impact loads. Thermoplastics, like polyvinyl chloride, are also easy to machine and cut and can be worked with almost any hand tool at the construction site.

It has been found, however, that vinyl siding has not always been satisfactory as an exterior sheathing material for irregular exterior wall surfaces. Due to earlier poor construction techniques, material inconsistency, or foundation settling, exterior walls in both new and old constructions are not always flat. Since vinyl siding, as opposed to metal siding, is very flexible, it usually conforms to the irregularities of the wall surface, resulting in a crooked, bowed, or unpleasing finish.

In order to compensate for this deficiency in vinyl siding, installers frequently must resort to using wooden shims which must be separately nailed to the support surface before the siding can be installed. Attempts have also been made to loosely nail the siding to the support surface so that the siding will "float" over the uneven portions of the exterior wall. In order to float the siding over the irregularities, but still provide a relatively straight and orderly appearance, the panel must be fairly rigid so as to span high and low points along the wall. Unfortunately, polyvinyl chloride, even in its most rigid state, only has a flexural modulus of about $0.5 \times 10^6$ psi, and a tensile strength of about $\frac{1}{7}$ of that of wrought aluminum.

Accordingly, there is a need for a thermoplastic-based siding panel that is more resistant to bending, or conforming to irregularities in exterior wall surfaces, but which retains its low cost and ability to be worked with ordinary hand tools at the construction site.

SUMMARY OF THE INVENTION

This invention provides exterior finishing panels having an aesthetically pleasing outwardly-facing surface. The panels include a rigid support member disposed along a portion of their length. This support member includes a flexural modulus, a measure of the materials "stiffness", which is greater than the flexural modulus of the thermoplastic sheet.

Accordingly, this invention provides vinyl siding which is stiffer and more resistant to bending along cracked, pitted, or bowed exterior wall surfaces than standard vinyl siding. The siding panels of this invention are reinforced, much like reinforced concrete is supported against tensile loads by steel rebar, to obtain a better "floating" effect along irregular surfaces. The panels are easier to handle, since they are not as susceptible to bending, and they are easier to install, since a rigid straight panel will lock into another rigid straight panel with less effort on a more consistent and predictable basis.

The exterior siding of this invention is able to ride uneven walls straighter, and presents a finished appearance which is flatter looking. The rigid panels will also provide the homeowner with a stronger and more rigid feel when the owner presses up against these newly-installed panels. Since the panels are stiffer, they can be provided in longer lengths over the current 12 foot standard length, with little chance of kinking. Since the preferred support members of this invention are also engineering thermoplastics themselves, they can be sawed with conventional hand tools, which will avoid unnecessary additional labor costs. As an additional benefit, the reinforced exterior siding panels of this invention are less resistant to wind damage and "blow offs", since the rigid supports will tend to distribute the wind load more efficiently to all of the nail heads.

In more preferred embodiments of this invention, siding panels are provided which include a plurality of elongated, simulated board members formed in an extruded sheet containing a rigid polyvinyl chloride. The panels of this embodiment include hook-and-groove fastening means for permitting the siding panel to be joined in overlapping fashion to an adjoining panel. These panels also include a preferred rigid support member including a flexural modulus which is relatively greater than the flexural modulus of the rigid polyvinyl chloride of the extruded sheet. The support member contains a polymer-matrix-composite which can be sawed with a standard saw blade made of steel.

The rigid support members of this invention can be fabricated from a multitude of materials including metal, thermoplastic, or thermosetting polymers and can be adhered to an inwardly-facing surface of the panel, extruded within the thickness of the thermoplastic sheet of the panel, or otherwise applied to the panel to reinforce it during handling, installation and use.

BRIEF DESCRIPTION OF THE DRAWINGS

The accompanying drawings illustrate preferred embodiments of the invention, as well as other information pertinent to the disclosure, in which.

DETAILED DESCRIPTION OF THE INVENTION

Exterior finishing panels are provided by this invention which include a thermoplastic sheet reinforced with a rigid support which greatly stiffens the panel without significantly detracting from its low cost or ability to be worked with conventional carpentry tools, such as steel drill bits and saw blades used in woodworking. As used herein, "finishing panels" refer to exterior finishing layers, such as soffits, vertical and horizontal siding, and accessories.

Figure 1:
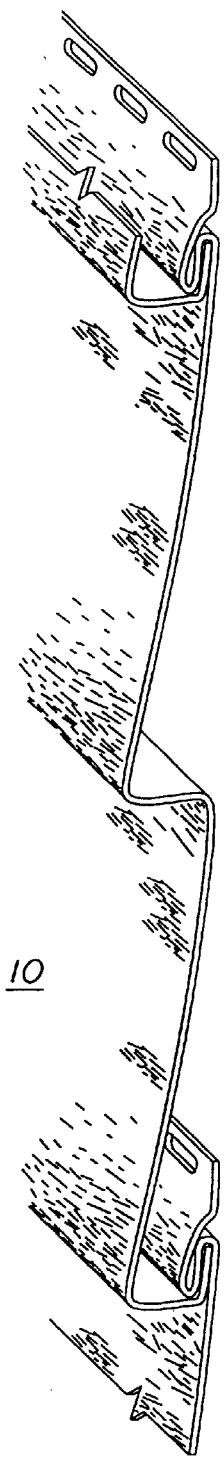
FIG. 1: is a partial, side perspective view of a conventional siding installation, illustrating locking hook-and-groove panels.
Figure 2:
FIG. 2: is a partial, side perspective view of a preferred exterior siding panel having a rigid support member disposed along a portion of its length.

With reference to the Figures, and particularly to FIGS. 1 and 2, there is shown a prior art siding panel 10 having a pair of simulated board members bound by a lateral flange located at the bottom of the top board member. The panel 10 also includes hook-and-groove fastening means for permitting it to be joined in overlapping fashion to an adjoining panel.

In a first embodiment of this invention, a siding panel 20 is provided having a hook-like lip 21 along the top portion of the panel 20. As shown in FIG. 2, this hook-like lip 21 forms a longitudinal aperture of about 0.125–0.50 inches in diameter along the panel's length. In this embodiment, a tubular rigid support member 25 is inserted into this aperture substantially along the length of the panel.

As described in FIG. 4, the rigid support member can take on a number of various cross-sectional configurations, that are only limited by design parameters. To save weight, and to optimize manufacturability or performance, the rigid support member can include an I-beam configuration 29, U-shaped configuration 28, or tubular configuration 25. Alternatively, a solid square or circular configuration 27 and 26 can be employed with similar effect.

Figure 5:
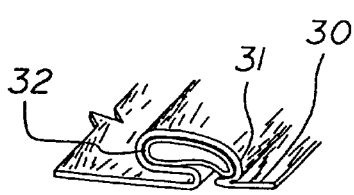
FIG. 5: is a partial, side perspective view of an alternative embodiment for the exterior siding panel of this invention.
Figure 6:
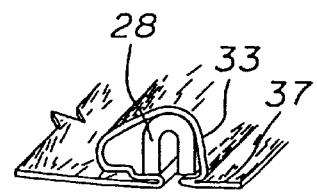
FIG. 6: is a partial, side perspective view of another alternative embodiment exterior siding panel of this invention.

As shown by the panel embodiment 30 in FIG. 5, a customized cross-sectional configuration can be designed to fit within a non-geometric, cross-sectional hollow space of hook-like lip 31, as shown in FIG. 5. This irregularly shaped, rigid support member 32 can be inserted to form a frictional fit in the contour of the hollow space. It is understood that the rigid support need not fill the entire cavity of the hook-like lip, and this is illustrated in FIG. 6, in which the U-shaped insert 28 is designed to fill only about half of the cavity formed by the marginal hook-like lip 33. This would provide more "give" to the lip of panel 37 for easier insertion of an adjoining panel.

Figure 3:
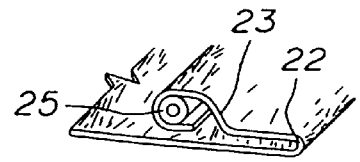
FIG. 3: is a partial, side perspective view of an alternative embodiment for the exterior siding panel of this invention.

Panel embodiments 20, 30, and 37 all describe a confined aperture, into which the rigid support member 25 can be inserted through a transverse end opening of the panel at the factory or construction site. In FIG. 3, the panel 22 exhibits a free end terminating to form a longitudinal slot for accepting rigid support member 25, which can be merely slipped under the lip 23. This hook-like lip 23, unlike those earlier described, provides for the facilitated introduction of the rigid support member 25, since the support member 25 can be merely pushed upwardly, beneath the lip 23, without the need for telescoping it through the entire length of the hollow space. The resiliency of the hook-like lip 23 will cause a clamping action that will aid in the insertion of the rigid support member 25 into the described longitudinal aperture. Those of ordinary skill in the art will understand that the siding panels of this invention can be extruded or molded into a variety of shapes and sizes, exhibiting various contours and aesthetic appearances. The hook-like lip portion can define a closed loop, or an open loop having its slot facing into the panel surface, or facing outwardly away from the panel surface. Other designs will be dictated by the individual application to be tackled.

Figure 7:
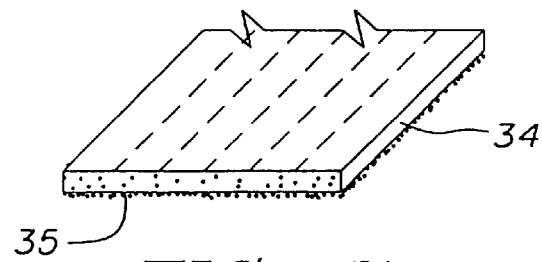
FIG. 7: is a partial, side perspective view of a preferred reinforcing tape of this invention.
Figure 4A:
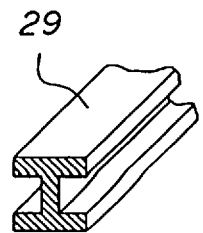
FIGS. 4(a)–(f): are partial, side perspective, cross-sectional, views of alternate constructions for the rigid support member of this invention.
Figure 4B:
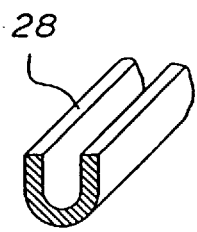
Figure 4C:
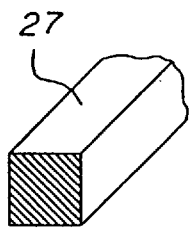
Figure 4D:
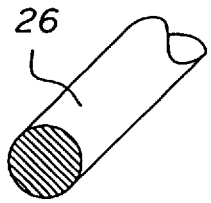
Figure 4E:
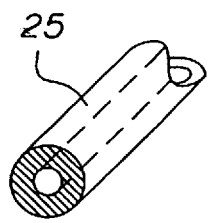
Figure 4F:
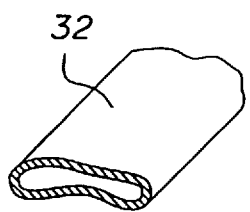
Figure 8:
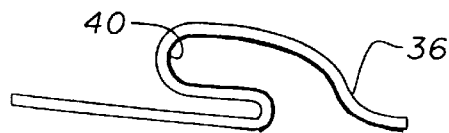
FIG. 8: is a partial, side view of a preferred exterior siding panel of this invention including the reinforcing tape of FIG. 7.
Figure 9:
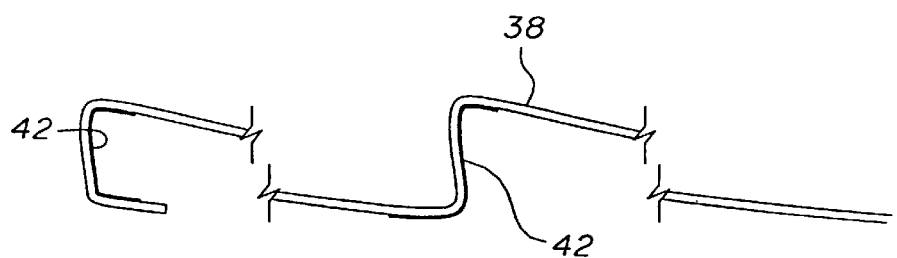
FIG. 9: is a partial, side view of an alternative exterior siding panel of this invention including the reinforcing tape of FIG. 7.

With reference to FIGS. 7–9, additional embodiments are described in which the rigid support member consists of a reinforcing tape. In the preferred embodiment described in FIG. 7, the reinforcing tape 34 comprises an adhesive 35 and a plurality of reinforcing threads, diagrammatically depicted as dotted lines. These threads can be one of a number of reinforcing agents available commercially, including glass, nylon, graphite, or aramid fibers.

As shown in FIG. 8, a panel is provided having a hook-like lip portion as substantially described above in FIG. 2, but instead of a rigid tubular support 25, a piece of reinforcing tape 40 is adhered to the inner surface of the cavity to reinforce the lip and provide greater stiffness to the overall panel 36.

An alternative embodiment is described in FIG. 9, in which a pair of reinforcing tape pieces 42 are disposed along the lateral marginal flanges of the individual board members of panel 38. Preferably, the tape is disposed so that its reinforcing fibers, or threads, are located along the longitudinal axis of the panel, although some measure of increased stiffness over the panel itself can be accomplished by locating the tape transversely or obliquely to this longitudinal axis. The tape can also contain a woven grid or random orientation of fibers. It may also be advantageous to provide a double-sided adhesive tape that could be used to simultaneously stiffen the siding panel, while helping to adhere the panel against the high spots on the supporting wall. The tape may be located at selected profile positions or encompass an entire panel surface.

Preferred adhesive compositions for the tape of these embodiments of this invention include those containing an elastomeric blend of selected rubber olefin terpolymer, plasticizer, reinforcing filler, tackifier and stabilizer. Other compositions suitable for this application include water-based, pressure-sensitive adhesives, such as acrylate adhesives, thermoplastic "hot melt" adhesives, and those adhesives containing natural or synthetic rubbers. Such compositions should be suitably tacky at temperatures ranging from about −50° F. to about 150° F. The tape may also be applied with heat, taking advantage of thermal properties by creating a melt bond.

Figure 10:
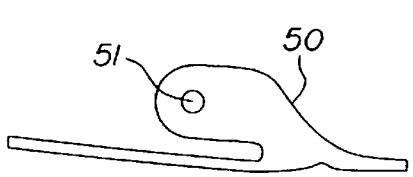
FIG. 10: is a partial, side view of an alternative exterior siding panel construction of this invention, including a rigid support member which has been co-extruded with the thermoplastic sheet of the panel.
Figure 11:
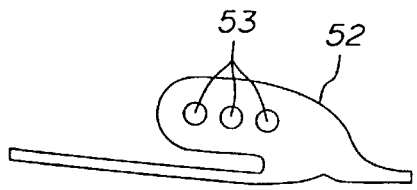
FIG. 11: is a partial, side view of an alternative exterior siding panel whereby a plurality of rigid support members are co-extruded with the thermoplastic sheet.
Figure 12:
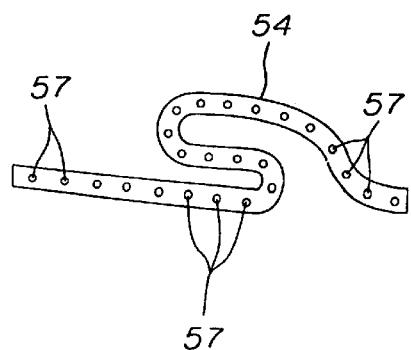
FIG. 12: is a side, cross-sectional view of a further exterior siding panel construction of this invention which includes a number of co-extruded, rigid support members located along the width of the thermoplastic sheet.

As shown in FIGS. 10–12, the thermoplastic sheet of the panel can be co-extruded or molded with the rigid support member to form an integral composite. In the embodiment described in FIG. 10, the rigid support member 51 is located in the hook-like lip of panel 50. The support member 51, like the tubular rigid support member 25 in FIG. 2, can be disposed substantially along the longitudinal edge of this lip so as to provide greater stiffness to both the lip and the panel. In the panel embodiment 52 described in FIG. 11, several rigid support members 53 are disposed longitudinally along the lip to provide even greater rigidity, and more uniform support. This technique can be extended to the entire panel, as described in panel embodiment 54. In this version, a series of substantially parallel rigid support members 57 are disposed longitudinally throughout the width of the thermoplastic sheet 54. Although the support members 57 are depicted to be substantially parallel, there is no reason why they can not crisscross throughout the structure to provide even greater structural support. In fact, it is envisioned that fibers can be layered throughout the sheet of the panel to increase the rigidity and resistance to bending moments, much like glass and graphite fibers reinforce epoxy in polymer-matrix-composites ("PMCs"). The sheet can also contain woven and non-woven mats of fiber, such as glass fiber, embedded in the resin or adhered to the surface of the panel.

The preferred materials for use in connection with the panels of this invention will now be described. All of the panels of this invention contain resinous materials, such as thermoplastic and thermosetting resins. A preferred thermoplastic material for the panels of this invention is polyvinyl chloride (PVC). PVC thermoplastics comprise the largest volume of thermoplastic polymer in commercial use. With various plasticizers, fillers, stabilizers, lubricants, and impact modifiers, PVCs can be compounded to be flexible or rigid, tough or strong, to have high or low density, or to have any of a wide spectrum of physical properties or processing characteristics. PVC resins can also be alloyed with other polymers, such as ABS, acrylic, polyurethane, and nitrile rubber to improve impact resistance, tear strength, resilience, or processability. They can be produced water-white in either rigid or flexible compositions, or they can be pigmented to almost any color.

In the preferred embodiments of this invention, rigid PVC, containing very little plasticizer, is employed. This material is a hard and tough and can be compounded to have a wide range of properties, including impact resistance and weatherability. It also has a tensile strength of about 6,000–7,500 psi, a percent elongation of about 40–80%, and a tensile modulus of about $3.5$–$6.0 \times 10^6$ psi. It can be acceptably used without chlorination, to about 140° F., and with chlorination to about 220° F. It also has a coefficient of thermal expansion of about $5$–$10 \times 10^{-5}$ inch/inch-°C.

The siding panels of this invention can be injection molded, extruded and drawn, using customary manufacturing techniques for thermoplastic and thermosetting materials. In the preferred embodiment, a mixture of PVC pellets is heated and extruded through a die to produce panels having a length of about 4–20 feet, and preferably about 12 feet. These panels can contain multiple simulated boards for greater structural integrity and faster installation. The extruded thermoplastic sheets can include a pigment for coloration, and can be subject to further molding, calendaring, and finishing to provide a wood grain or fanciful texture.

The preferred rigid support members will now be described. As shown in FIGS. 4(a)–(f), the rigid support members of this invention are preferably elongated members of narrow thickness or diameter, (preferably about 0.1–2.0 inches), that are distributed substantially along the length of the thermoplastic sheet in the siding panel. The preferred rigid supporting member should have a flexural modulus of at least about 50%, and preferably at least 100% greater than the flexural modulus of the thermoplastic sheet. Materials that would satisfy this requirement for PVC panels include wood, most metals, including brass, aluminum, steel, and many thermoplastic and thermosetting resins. Of these, reinforced PMCs show the most promise for this application, because of their high strength-to-weight ratio.

Unreinforced engineering thermoplastics typically have a tensile strength in the range of about 55–100 MPa ($8 \times 10^3$ to $15 \times 10^3$ psi). The workhorse of engineering resins, unreinforced nylon 6/6, has a tensile strength of about 83 MPa ($12 \times 10^3$ psi) and a tensile modulus of about 34 GPa ($5 \times 10^6$ psi). However, unlike metals, such as aluminum or steel, stiffness in plastics is guided by the flexural modulus. In applications involving low strain, however, such as those found in vinyl siding, tensile and flexural moduli are close to being identical for design purposes.

It is known that by reinforcing thermoplastics and thermosets, the stiffness of these resins can be dramatically increased. Short glass fibers at 5–30% (by weight) boost the tensile strength of engineering plastics by about a factor of two; carbon fibers, even further.

On the high end of the composite material spectrum are advanced PMCs. Reinforced with high-modulus and high-strength graphite fibers, a unidirectional laminate typically has a tensile modulus of about 138–200 GPa ($20$–$29 \times 10^6$ psi) and about a 1,138–1,552 MPa ($165$–$225 \times 10^3$ psi) tensile strength. Other reinforcing fibers for advanced composites include boron, S-glass, E-glass, carbon fibers, long glass fibers, and aramid.

Advanced PMCs have higher specific strength and stiffness than most metals, and the ability to selectively place fibers for design versatility. Varying fiber orientation, concentration, and even generic fiber type, permits tailoring of stiffness and strength to a specific application. Braiding and weaving of the reinforcements have also been used to produce stronger components. Techniques using unreinforced liquid-crystal polymers (LCPs), high strength graphite fibers, polyphenylene benzobisthiazole (PBT), and polyphenylene benzobisoxozole (PBO) fibers have also produced high strength polymer-matrix-composites with environmental stability.

The preferred rigid support members of this invention contain thermoplastic materials. Preferred resins for the rigid support members can contain, for example, thermoplastic polyimides, polyesters, and nylons. Because of their inherently faster processing (no time-consuming curing or autoclaving) thermoplastic matrix-composites are beginning to replace conventional thermoset composites. Some current examples of processing techniques include lamination, filament winding, and pultrusion. Thermoforming, hot stamping of consolidated sheet, and roll forming processes are also promising techniques for producing the support members of this invention.

A comparison of the mechanical properties for selected polymer-matrix-composites, polyvinyl chloride, steel and aluminum is shown below in Table I.

TABLE I

Mechanical Properties of Polyvinyl Chloride, Unidirectional Advanced PMCs[1], Glass Fiber-Reinforced PMCs, Steel, and Aluminum

|  | Tensile Strength, × $10^3$ psi | Tensile Modulus, × $10^6$ psi | Flexural Strength, × $10^3$ psi | Flexural Strength, × $10^6$ psi |
|---|---|---|---|---|
| Boron/Epoxy | 199 | 29.2 | — | — |
| Boron/Polyimide | 151 | 32.1 | — | — |
| S-Glass/Epoxy | 187 | 8.8 | — | — |
| High-Modulus Graphite/Epoxy | 122 | 27.5 | — | — |
| High-Modulus Graphite/Polyimide | 117 | 31.3 | — | — |
| High-Strength Graphite/Epoxy[2] | 218 | 21.0 | — | — |
| Aramid/Epoxy[3] | 172 | 12.2 | — | — |
| High-Strength Graphite/Epoxy[4] | 220 | 16.0 | — | — |
| Polyvinyl Chloride (Rigid) | 7.5 | 0.6 | — | — |
| Polyvinyl Chloride (Flexible) | 1.5 | — | — | — |
| Glass/Comp. Molded Polyester BMC[4] | 6.0 | 1.75 | 12.8 | 1.58 |
| Glass/Inj. Molded Polyester BMC[4] | 4.86 | 1.53 | 12.65 | 1.44 |
| Glass/Comp. Molded Polyester SMC[5] | 23.0 | 2.27 | 45.0 | 2.0 |
| Glass/Comp. Molded Polyester SMC[5] | 12.0 | 1.7 | 26.0 | 1.6 |
| Glass/Comp. Molded Polyester SMC[5] | 5.3 | 1.7 | 16.0 | 1.4 |
| Glass/Polyester Pultrusions | 30.0 | 2.5 | 30.0 | 1.6 |
| Glass/Filament-Wound Epoxy | 80.0 | 4.0 | 100.0 | 5.0 |
| Glass/Polyester, Spray-Up/Lay-Up | 12.5 | 1.0 | 27.0 | 0.75 |
| Glass/Polyester, Woven Roving (Lay-Up) | 37.0 | 2.25 | 46.0 | 2.25 |
| Cold-Rolled, Low Carbon Steel[7] | 48.0 | 30.0 | — | — |
| Wrought Aluminum | 49.0 | 10.2 | — | — |

[1]Property values shown are in longitudinal direction;
[2]UNION CARBIDE THORNEL T-300 fibers;
[3]DUPONT KEVLAR 49;
[4]Bulk molding compound;
[5]Sheet molding compound;
[7]SAE 1008.

It is understood that the rigid support members of this invention can be inserted in apertures along the siding panels, adhered to an inwardly-facing surface of the panels, and/or molded or extruded integrally with the panel to reinforce it at a single location, or at multiple locations along its width.

From the foregoing, it can be realized that this invention provides stiffer exterior siding panels and methods for installing siding panels. These panels will have a greater ability to float over uneven wall surfaces with a minimum amount of distortion since they are reinforced substantially along their length to resist bending. The panels also preferably contain polymer-matrix-composites which can be cut and sawed with conventional hand tools at a construction site. Stiffer panels, possibly 300% stiffer than conventional vinyl siding can be produced, with a minimum amount of increased cost. These panels will be perceived as having a higher quality, since siding purchasers have associated stiffness as being a significant factor in quality measurement. Any additional cost generated by the addition of rigid support members is likely to be compensated by the reduction of waste normally associated with kinked panels and "blow offs" due to wind or rough handling. Although various embodiments have been illustrated, this was for the purpose of describing, and not limiting the invention. Various modifications, which will become apparent to one skilled in the art, are within the scope of the invention described in the attached claims.

LIST OF REFERENCE NUMERALS

| 10 | Prior Art Siding Panel |
| 20 | Siding Panel |
| 21 | Hook-Like Lip |
| 22 | Siding Panel |
| 23 | Hook-Like Lip |
| 25 | Tubular Configuration |
| 26 | Circular Configuration |
| 27 | Square Configuration |
| 28 | U-Shape Configuration |
| 29 | I-Beam Configuration |
| 30 | Siding Panel |
| 31 | Hook-Like Lip |
| 32 | Irregular Configuration |
| 33 | Hook-Like Lip |

-continued

LIST OF REFERENCE NUMERALS

| | |
|---|---|
| 34 | Reinforcing Tape |
| 35 | Adhesive |
| 36 | Siding Panel |
| 37 | Siding Panel |
| 38 | Siding Panel |
| 40 | Reinforcing Tape |
| 42 | Reinforcing Tape |
| 50 | Siding Panel |
| 51 | Rigid Support Member |
| 52 | Siding Panel |
| 53 | Rigid Support Members |
| 54 | Siding Panel |
| 57 | Rigid Support Members |

What is claimed is:

1. An exterior finishing panel, comprising:
an elongated thermoplastic sheet including a hook-like lip for fastening said finishing panel to an adjoining finishing panel, an outwardly-facing surface having an aesthetic appearance and an inwardly-facing surface; and
a rigid support member co-extruded or molded along a portion of the length of said thermoplastic sheet, said rigid support member having a flexural modulus substantially greater than the flexural modulus of said thermoplastic sheet.

2. The exterior finishing panel of claim 1, wherein said elongated thermoplastic sheet comprises a polyvinyl chloride extrusion including a plurality of simulated board members.

3. The exterior finishing panel of claim 2, wherein said rigid support member comprises a polymeric material having a flexural modulus of at least 50% greater than the flexural modulus of the thermoplastic sheet.

4. The exterior finishing panel of claim 3, wherein said rigid support member is co-extruded through a die along with said exterior finishing panel.

5. The exterior finishing panel of claim 1, wherein said rigid support member is disposed proximate to said hook-like lip.

6. The exterior finishing panel of claim 5, wherein said rigid support member comprises fibrous reinforcement.

7. The exterior finishing panel of claim 1, wherein said elongated thermoplastic sheet comprises a plurality of rectangular sheathing sections having lateral marginal flanges.

8. The exterior finishing panel of claim 1, wherein said rigid support member comprises a rigid polymeric material containing a reinforcement in a polymer matrix.

9. The exterior finishing panel of claim 8 wherein said polymeric material comprises a polymer matrix composite.

10. The exterior finishing panel of claim 9 wherein said polymer matrix composite is co-extruded onto said inwardly-facing surface of said elongated thermoplastic sheet.

11. The exterior finishing panel of claim 8 wherein said rigid support member comprises a relatively rigid elongated member coextruded along at least a portion of the length of said thermoplastic sheet, said elongated member comprising a rigid polyvinyl chloride composition.

12. An exterior finishing panel, comprising:
an elongated thermoplastic sheet comprising a first outwardly-facing surface and a second inwardly-facing surface; and
an elongated reinforcing member co-extruded along said exterior finishing panel, said thermoplastic sheet and elongated reinforcing member capable of being cut by a steel saw blade;
said elongated reinforcing member having a flexural modulus substantially greater than the flexural modulus of said thermoplastic sheet.

13. The exterior finishing panel of claim 12 wherein said elongated reinforcing member comprises a strip of thermoplastic material containing a reinforcement material.

14. The exterior finishing panel of claim 12 wherein said reinforcement material contains a fiber.

15. An elongated thermoplastic sheet including hook-and-groove fastening means for permitting said siding panel to be joined in overlapping fashion to an adjoining panel; and
a rigid strip of reinforced thermoplastic material melt bonded along said elongated thermoplastic sheet, said rigid strip and said elongated thermoplastic sheet being capable of being cut by a steel saw blade, said rigid strip having a flexural modulus which is at least 50% greater than the flexural modulus of said elongated thermoplastic sheet.

* * * * *